United States Patent
Rawdon et al.

(10) Patent No.: US 8,128,025 B2
(45) Date of Patent: Mar. 6, 2012

(54) PROVIDING SKINS FOR AIRCRAFT FUSELAGES

(75) Inventors: Blaine K. Rawdon, San Pedro, CA (US); Robert E. Grip, Rancho Palos Verdes, CA (US)

(73) Assignee: The Boeing Company, Chicago, IL (US)

( * ) Notice: Subject to any disclaimer, the term of this patent is extended or adjusted under 35 U.S.C. 154(b) by 732 days.

(21) Appl. No.: 12/053,345

(22) Filed: Mar. 21, 2008

(65) Prior Publication Data

US 2009/0236473 A1 Sep. 24, 2009

(51) Int. Cl.
*B64C 1/12* (2006.01)
(52) U.S. Cl. ................... 244/117 R; 244/132
(58) Field of Classification Search .............. 244/117 R, 244/219, 119, 133, 123.12, 137.4, 132
See application file for complete search history.

(56) References Cited

U.S. PATENT DOCUMENTS

| | | | | |
|---|---|---|---|---|
| 222,335 | A * | 12/1879 | Webb | 432/211 |
| 1,755,886 | A * | 4/1930 | McKenzie | 244/219 |
| 1,838,334 | A * | 12/1931 | Stout | 244/54 |
| 2,228,253 | A * | 1/1941 | Berliner | 244/117 R |
| 2,638,291 | A * | 5/1953 | Northrop et al. | 244/118.1 |
| 2,901,590 | A * | 8/1959 | Watter et al. | 219/78.12 |
| 2,945,653 | A * | 7/1960 | Atkin | 244/119 |
| 3,240,445 | A * | 3/1966 | Ellzey | 244/207 |
| 3,388,651 | A * | 6/1968 | Axelrod | 446/34 |
| 3,740,905 | A * | 6/1973 | Adams | 52/404.3 |
| 4,095,760 | A * | 6/1978 | Sommer et al. | 244/123.1 |
| 4,232,093 | A * | 11/1980 | Miller | 428/591 |
| 4,344,591 | A * | 8/1982 | Jackson | 244/159.1 |
| 5,489,074 | A * | 2/1996 | Arnold et al. | 244/159.1 |
| 6,042,055 | A * | 3/2000 | Messinger | 244/131 |
| 6,227,498 | B1 * | 5/2001 | Arata | 244/219 |
| 6,293,496 | B1 * | 9/2001 | Moe | 244/119 |
| 6,547,181 | B1 | 4/2003 | Hoisington et al. | |
| 6,722,610 | B1 | 4/2004 | Rawdon et al. | |
| 6,848,650 | B2 | 2/2005 | Hoisington et al. | |
| 6,926,235 | B2 * | 8/2005 | Ouellette et al. | 244/119 |
| 7,095,364 | B1 | 8/2006 | Rawdon et al. | |
| 7,657,988 | B2 * | 2/2010 | Greene | 244/117 R |
| 2007/0025832 | A1 | 2/2007 | Rawdon et al. | |
| 2007/0141376 | A1 * | 6/2007 | Askishev et al. | 428/593 |
| 2007/0177707 | A1 | 8/2007 | Rawdon | |

OTHER PUBLICATIONS

Pilot Press Copyright Drawing, publication date unknown.

* cited by examiner

*Primary Examiner* — Galen Barefoot
(74) *Attorney, Agent, or Firm* — Harness, Dickey & Pierce, P.L.C.

(57) ABSTRACT

An aircraft including a space frame fuselage structure. A plurality of panels are connected with the structure and configured to form a skin over the structure. The panels are movable relative to one another so as to prevent loading of the structure from inducing loading in the skin.

40 Claims, 15 Drawing Sheets

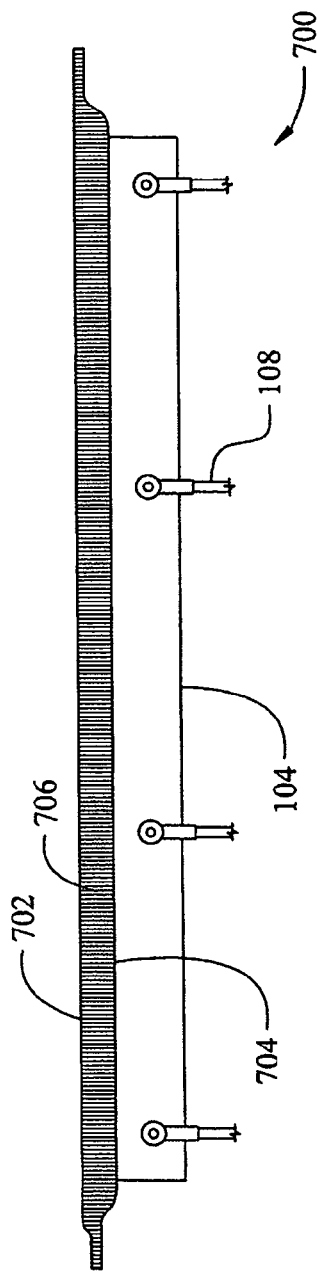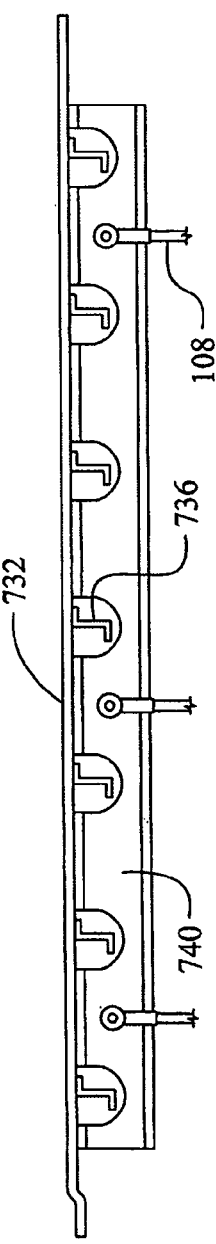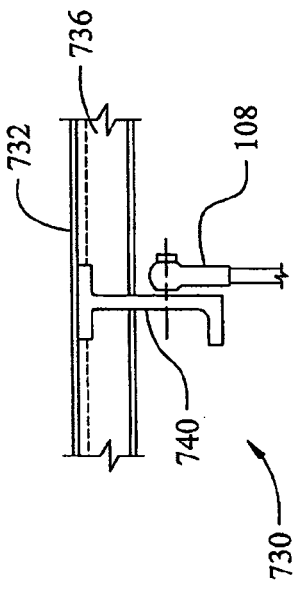

PROVIDING SKINS FOR AIRCRAFT FUSELAGES

FIELD

The present disclosure relates generally to aircraft and more particularly (but not exclusively) to providing a skin for an aircraft fuselage.

BACKGROUND

The statements in this section merely provide background information related to the present disclosure and may not constitute prior art.

The skin of an aircraft typically provides aerodynamic surfaces on aircraft components such as wings and the fuselage. The skin of an aircraft fuselage may take different forms dependent on the structure of the fuselage. Most aircraft fuselage structures of the commonly-used "semi-monocoque" type have a skin to which stringers and frames are typically added to stabilize the skin. The skin itself typically is thickened, or stiffened, to avoid buckling under some load conditions. Truss fuselage structures typically have a membrane skin made from a thin, relatively elastic material such as cloth.

SUMMARY

The present disclosure, in one implementation, is directed to an aircraft including a space frame fuselage structure. A plurality of panels are connected with the structure and configured to form a skin over the structure. The panels are movable relative to one another so as to prevent loading of the structure from inducing loading in the skin.

In another implementation, the disclosure is directed to a method of assembling an aircraft. The method includes forming a skin over a fuselage structure. Forming the skin includes attaching a plurality of panels to the structure so as to leave each completely attached panel structurally independent of the other attached panels.

In another implementation, the disclosure is directed to a method of assembling an aircraft. A fuselage and a plurality of panels for forming a skin of the fuselage are provided. The method includes attaching the panels to the fuselage, and adjusting location of one or more of the attached panels relative to the fuselage.

In still another implementation, the disclosure is directed to an aircraft skin panel. The panel includes a first side having a substantially smooth surface, and a second side having a plurality of link mounting points configured to receive links for linking the panel with an aircraft fuselage structure. The mounting points are further configured to transfer loading of the panel through the links to the fuselage structure.

In another implementation, the disclosure is directed to a method of making an aircraft skin panel. A membrane material is applied to at least one side of a corrugated sheet to form a membrane substantially spanning corrugations of the sheet.

In still another implementation, the disclosure is directed to a method of providing equipment on an aircraft. The method includes attaching a skin panel to a fuselage structure of the aircraft. The panel includes an item of equipment and an interconnect connected with the item. The method also includes connecting the skin panel interconnect with an interconnect provided on the fuselage structure.

In yet another implementation, the disclosure is directed to a method of repairing an aircraft. The method includes removing one of a plurality of panels forming a skin of the aircraft, and attaching a replacement panel to the aircraft in place of the removed panel.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 14 is a sectional view, looking forward, of a sandwich panel in accordance with one implementation of the disclosure;

FIG. 15A is a sectional view, looking forward, of a semi-monocoque panel in accordance with one implementation of the disclosure;

FIG. 15B is a top view of the semi-monocoque panel shown in FIG. 15A.

DETAILED DESCRIPTION

Figure 1:
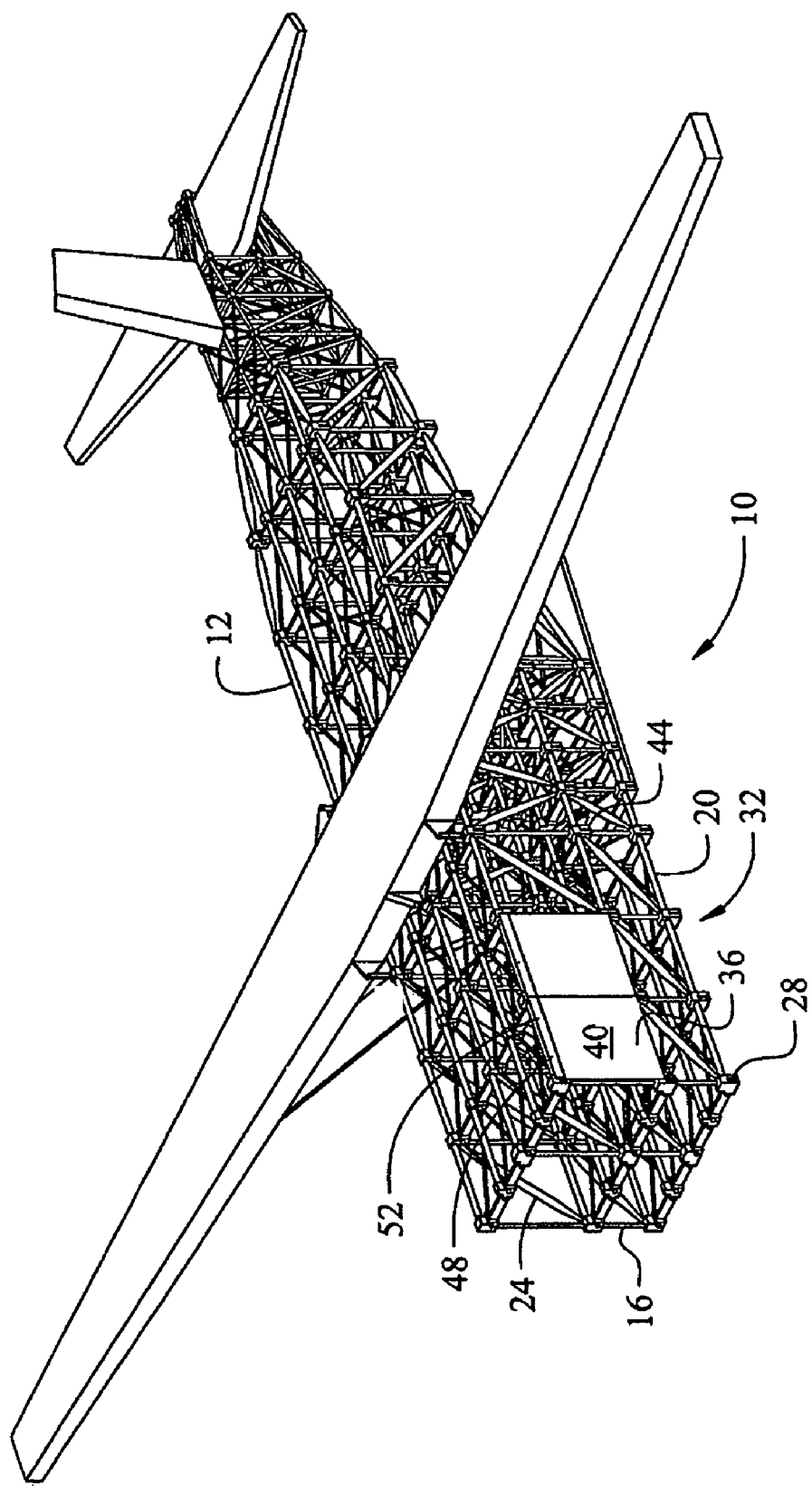
FIG. 1 is a perspective view of selected portions of an aircraft having a skin panel system in accordance with various implementations of the disclosure, a portion of the skin panel system being shown.

The following description is merely exemplary in nature and is not intended to limit the present disclosure, application, or uses. It should be understood that throughout the drawings, corresponding reference numerals indicate like or corresponding parts and features.

The present disclosure, in some implementations, is directed to a skin system for an aircraft fuselage. A plurality of panels are connected with the fuselage and configured to form a skin over the fuselage. The panels are movable relative to one another so as to prevent distortional loading of the fuselage from inducing in-plane loading in the skin. Various implementations are contemplated for use in relation to a space frame fuselage structure, e.g., a truss fuselage structure that is not pressurized. One such fuselage structure is described in co-pending U.S. patent application Ser. No. 11/743,929, filed May 3, 2007, entitled "Space Frame Fuselage Structure and Related Methods", the disclosure of which is incorporated herein in its entirety.

One configuration of an aircraft having a fuselage structure for which a skin may be provided in accordance with various implementations of the disclosure is indicated generally in FIG. 1 by reference number 10 (selected portions of the aircraft being shown). A space frame fuselage structure 12 includes a plurality of vertical truss elements 16, horizontal truss elements 20, and diagonal truss elements 24. The elements (16, 20, 24) include cylindrical and rectangular tube elements. Truss elements (16, 20, 24) generally are configured to converge at a plurality of rectangular solid node elements 28. The fuselage structure 12 is unpressurized although the aircraft 10 has a pressurized crew compartment (not shown). The structure 12 is configured to carry standardized, modular containers that may be connected to the structure 12 at discrete points, i.e., at various node elements 28. When the fuselage structure 12 is highly loaded, distances between various node elements can change, thereby changing the shape of the fuselage structure as a result of the loading.

One configuration of a skin (of which a portion is shown in FIG. 1) for enclosing the fuselage structure 12 is indicated generally by reference number 32. The skin 32 provides streamlining and weather protection for the fuselage 12. As further described below, the skin 32 is configured to accommodate in-plane distortion of the fuselage structure 12 and to transfer aerodynamic pressure loading into the structure 12. For example, in the case of side panels 40, the fuselage structure may distort variously in the vertical-longitudinal plane that is essentially parallel to the plane of the side panels 40. Aerodynamic pressure loading, which is the primary loading on the skin 32, arises from a pressure differential between the inside and outside of the aircraft. The pressure loading is approximately orthogonal to the skin surface in an out-of-plane direction.

In various implementations, the skin 32 includes a plurality of substantially rigid skin panels 36. Four exemplary panels 36 are shown in FIG. 1. Two of the panels 36 are side panels 40 oriented vertically and located forwardly on a side 44 of the fuselage 12. The two other exemplary panels 36 shown in FIG. 1 are smaller corner panels 48 located directly above the side panels 40. The skin panels 36 overlap with one another to allow for relative motion while preventing excessive leakage of air and/or moisture. When the fuselage structure 12 is covered by panels 36, relative motion of the panels 36, e.g., one panel "sliding" relative to another, permits flexure of the fuselage structure 12 with negligible stresses induced between the fuselage structure and the skin panels.

The outer surface of the skin 32 can have an overall shape determined primarily by aerodynamic considerations. Size(s) of skin panels may be determined based, e.g., on considerations as to ease of mounting to the underlying structure, number of sliding joints, and manufacturing considerations (e.g., size of panel versus part count). In the present exemplary embodiment, the side panel 40 is approximately twenty (20) feet in length and approximately twenty (20) feet in height. It should be noted generally that panels could have various shapes and sizes dependent, e.g., on location of a particular panel relative to a fuselage. A panel could have any number of sides and/or a partially or completely curved perimeter. Furthermore, a panel is not necessarily flat. For example, the corner panels 48 partially wrap an edge 52 of the fuselage structure 12. A single panel could be flat, curved and/or angled in various areas of the panel. A panel could have substantially any shape, whether regular or irregular.

Figure 2:
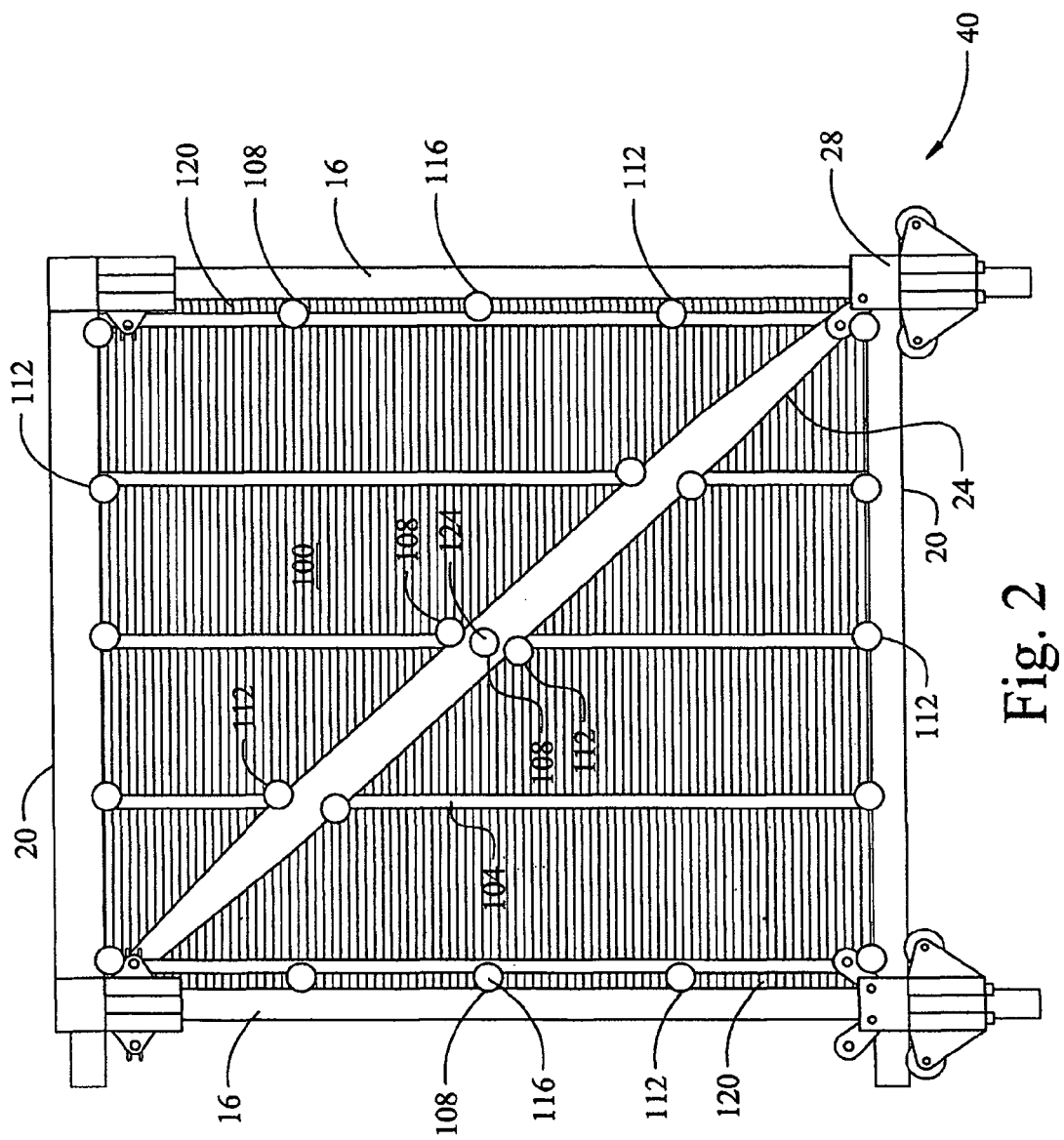
FIG. 2 is a view, taken from inside the aircraft and looking outboard, of a side panel shown in FIG. 1.

One of the side panels 40 is shown in greater detail in FIG. 2. FIG. 2 is a view, taken from inside the fuselage structure 12 and looking outboard, of an inboard side 100 of the panel 40. The panel 40 has a plurality of vertical support beams 104. The panel 40 is attached to the underlying space frame structure 12 by a plurality of mechanical links 108, indicated schematically as circles in FIG. 2. Linkage constraints are arranged so that they would not conflict with the space frame 12 as it flexes. The links 108 are adjustable in length so that the skin panel 40 may be located with substantial precision relative to the space frame 12 and other panels 36.

The links 108 include a plurality of orthogonal links 112 oriented to transfer loads that are orthogonal to the skin panel 40. The orthogonal links 112 are distributed across the perimeter and body of the panel 40, connecting the space frame structure 12 to the panel support beams 104. Primary orthogonal loads are transferred, e.g., via twenty (20) approximately regularly spaced links 112 as shown in FIG. 2.

Additional links 108 are provided to constrain panels 36 on other axes. For example, two vertical support connections 116 are provided in the middle of the forward and aft edges 120 of the panel 40 and are connected to vertical elements 16 of the space frame 12. Vertical support connections 116 also provide orthogonal linkage and transfer orthogonal loads as further described below. A longitudinal support connection 124 is provided at the center of the panel 40 to restrain fore-aft movement of the panel 40 with respect to the space frame 12. Providing such a connection at a central location tends to equalize the longitudinal motion of the panel 40 relative to the space frame 12 at the panel's fore and aft edges. Similarly, locating the vertical support connections centrally between the panel's upper and lower edges tends to equalize vertical motion at the upper and lower edges.

Orthogonal Links

Figure 3:
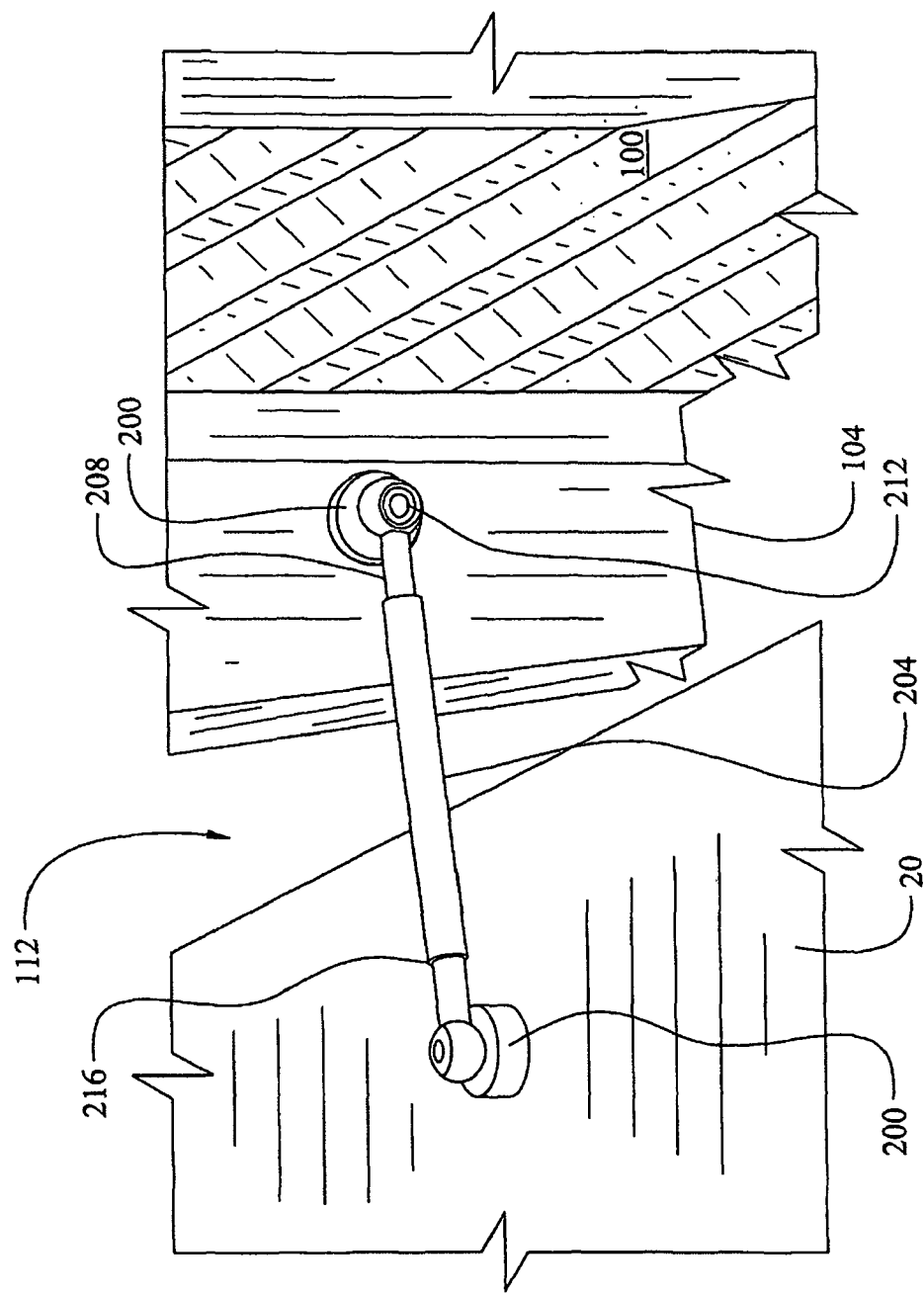
FIG. 3 is a perspective view, taken from inside an aircraft, of an orthogonal link in accordance with one implementation of the disclosure.

An exemplary orthogonal link 112 is shown in greater detail in FIG. 3. The links 112 are approximately orthogonal to the inboard side 100 of the panel 40 so that they are aligned with the direction of primary aerodynamic pressure load. The link 112 is attached between a horizontal element 20 of the space frame 12 and a panel support beam 104 via reinforced mounting points or bosses 200. The link 112 includes a link body 204 having two rod ends 208. In the present exemplary link 112, a spherical bushing 212 in a rod end 208 permits vertical and longitudinal motion of the panel 40 while constraining orthogonal motion of the panel 40. This arrangement permits link mounting points 200 on the space frame 12 to move slightly with respect to one another in a plane parallel to the panel 40 without imposing a load on the panel 40. Thus the space frame 12 can have relatively large in-plane deflections without imposing a load on the skin panel 40. Relative motion of the mounting points 200 could result in a slight non-orthogonality of the links, thereby causing an extremely small change in the orthogonal location of the panel 40 with respect to the space frame 12. In such case, however, inherent out-of-plane flexibility of the skin panel 40 would typically render the loads imposed by such displacement negligible.

Each of the rod ends 208 is attached to the linkage body 204 via a threaded connection 216. For example, the body 204 may include a tube having female threads (not shown) to receive a male-threaded end 208. The sense of the threads may be opposite at opposite ends of the link 112. That is, the threads at one end may be right-handed and at the other end, left-handed. This arrangement can permit extremely fine adjustment of linkage length when the link body 204 is turned with respect to the rod ends 208. Furthermore, the link body 204 may be turned after the rod ends 208 are fastened to the space frame 12 and the skin panel 40. Thus the location of the skin panel 40 may be adjusted with substantial precision while it is mounted to the space frame 12. No removal of the panel 40 is necessary. Alternatively, both threads may be of the same sense. In such case, adjustments may be made, e.g., in half-turn increments after removing at least one end of the link 112 from the space frame 12 or skin panel 40. Jam nuts (not shown) could be used to lock each rod end 208 to the body 204.

Figure 4:
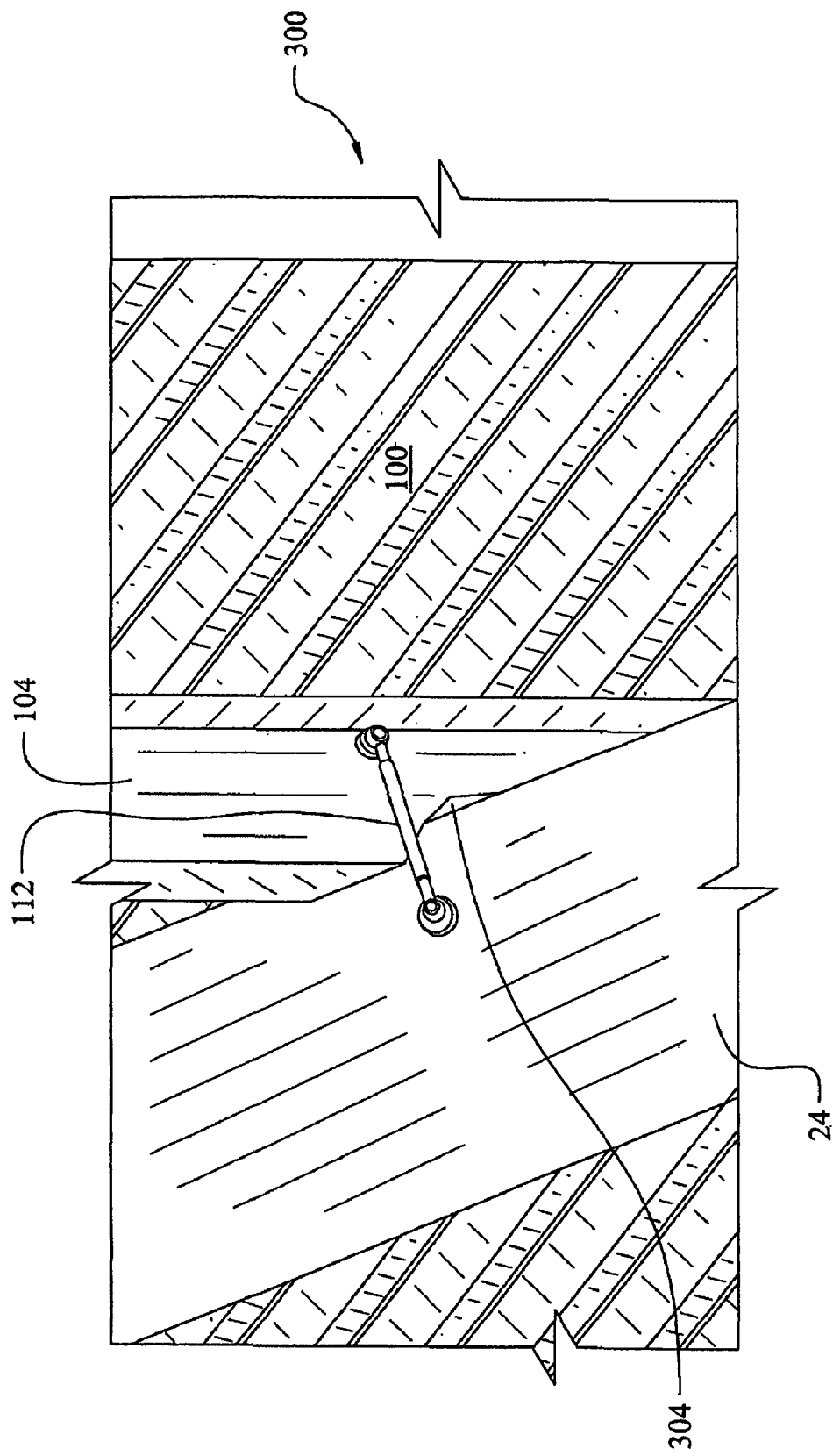
FIG. 4 is a perspective view, taken from inside an aircraft, of an orthogonal link in accordance with one implementation of the disclosure.

Another configuration of an orthogonal link is indicated generally in FIG. 4 by reference number 300. A link 112 connects a diagonal truss element 24 and a panel support beam 104. A cutout 304 is provided in the panel support beam 104 to clear the diagonal truss element 24. A second link (not shown) may be provided on the opposite side of the diagonal element 24 to minimize loads in the region of the cutout 304 of the panel support beam 104.

Vertical Support Connections

Figure 5:
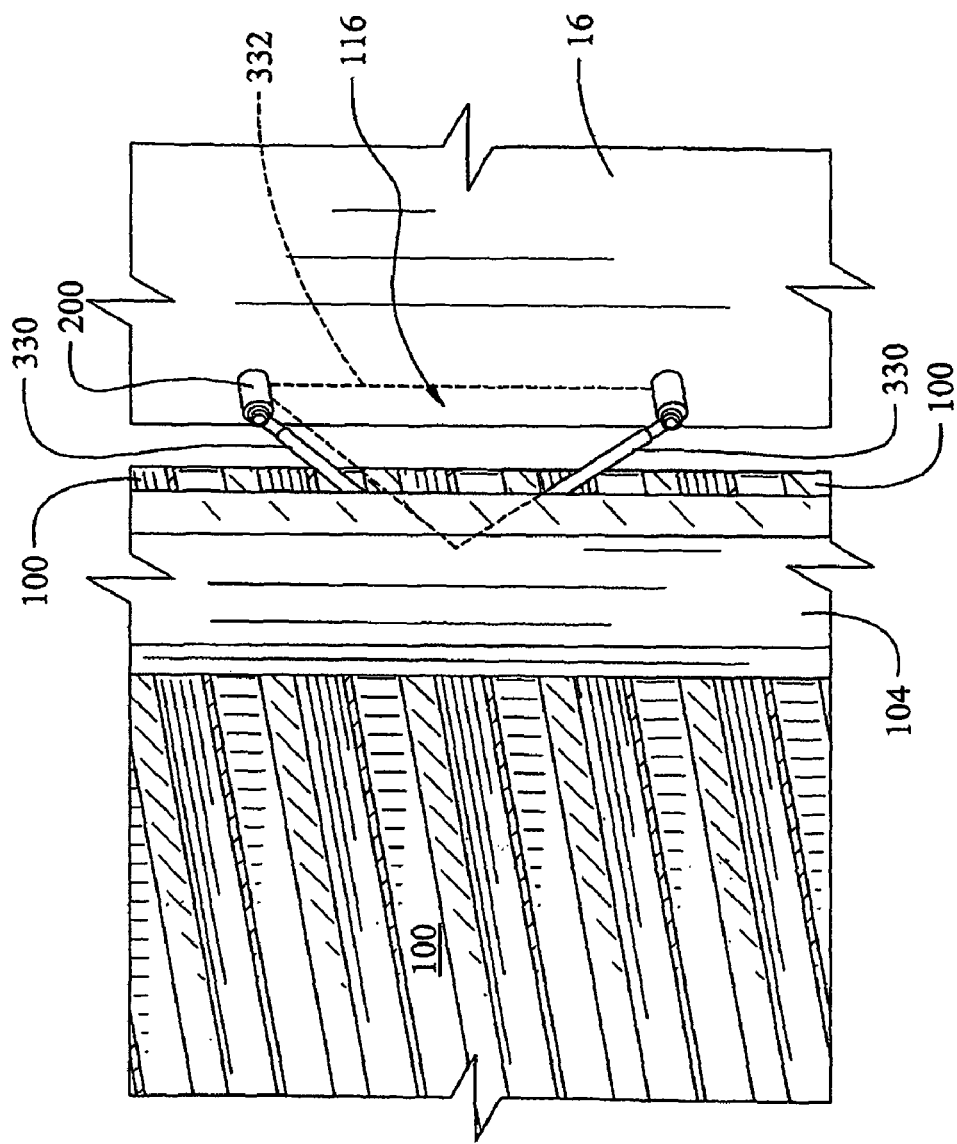
FIG. 5 is a perspective view, taken from inside an aircraft, of a vertical support connection in accordance with one implementation of the disclosure.
Figure 6:
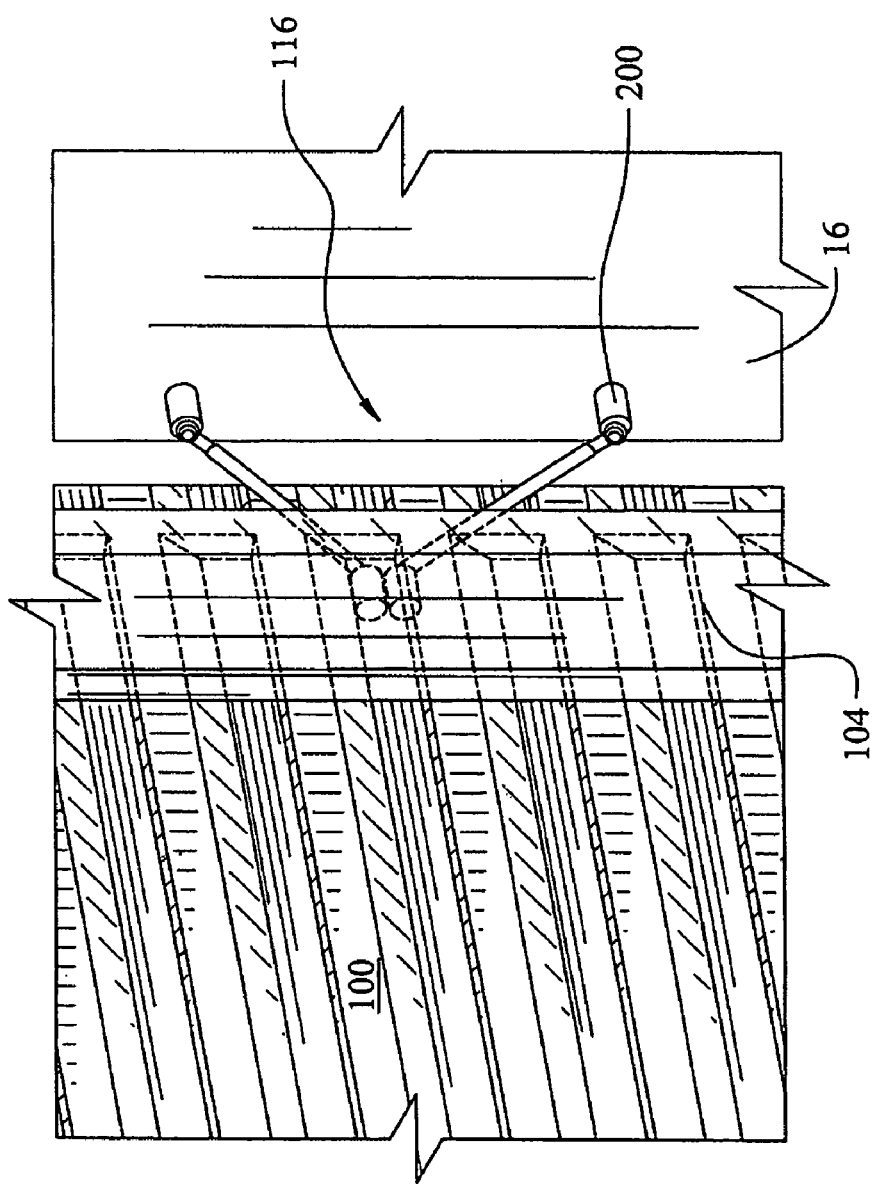
FIG. 6 is a perspective view, taken from inside an aircraft, of a vertical support connection in accordance with one implementation of the disclosure.

An exemplary vertical support connection 116 is shown in FIG. 5. Each vertical support connection 116 includes a pair of links 330 that form an approximate triangle 332 (shown in dashed lines) to constrain vertical motion of the skin panel 40. The two links 330 also provide orthogonal support. The vertical support links 330 are the same as or similar to the orthogonal links 112 in construction and include a capability for changing length. The two links 330 shown in FIG. 5 connect a vertical space frame element 16 and a panel support beam 104. The vertical support connection 116 is also shown in FIG. 6, in which two closely-mounted bosses 200 that receive loads from the two links 330 are visible through the panel support beam 104.

Referring again to FIG. 2, the two vertical support connections 116 transfer weight and inertial loads from the panel 40 into the space frame 12. The two connections 116 also prevent in-plane rotation of the panel by virtue of their distance from each other. By lengthening one link 330 and shortening the other link 330, it is possible to raise or lower the panel 40 with respect to the space frame 12 without changing an orthogonal distance (i.e., in and/or out). On the other hand, lengthening or shortening both links can move the panel 40 in and/or out (orthogonally) relative to the space frame structure 12 without moving the panel 40 up or down.

A change in distance between fore and aft space frame vertical elements 16 to which the vertical support connections 116 are attached is typically absorbed by a slight change in angle of the links 330. This results in a very small change in the orthogonal (in-out) distance that can be absorbed by out-of-plane flexure of the panel 40. A change in length of either vertical element 16 due to axial compression or tension results in a very slight change in geometry of the link triangle 332. Such change also tends to move the panel 40 in or out by a very slight amount. Again, such very slight motion is absorbed by out-of-plane flexure of the panel 40.

Longitudinal Support Connection

Figure 7:
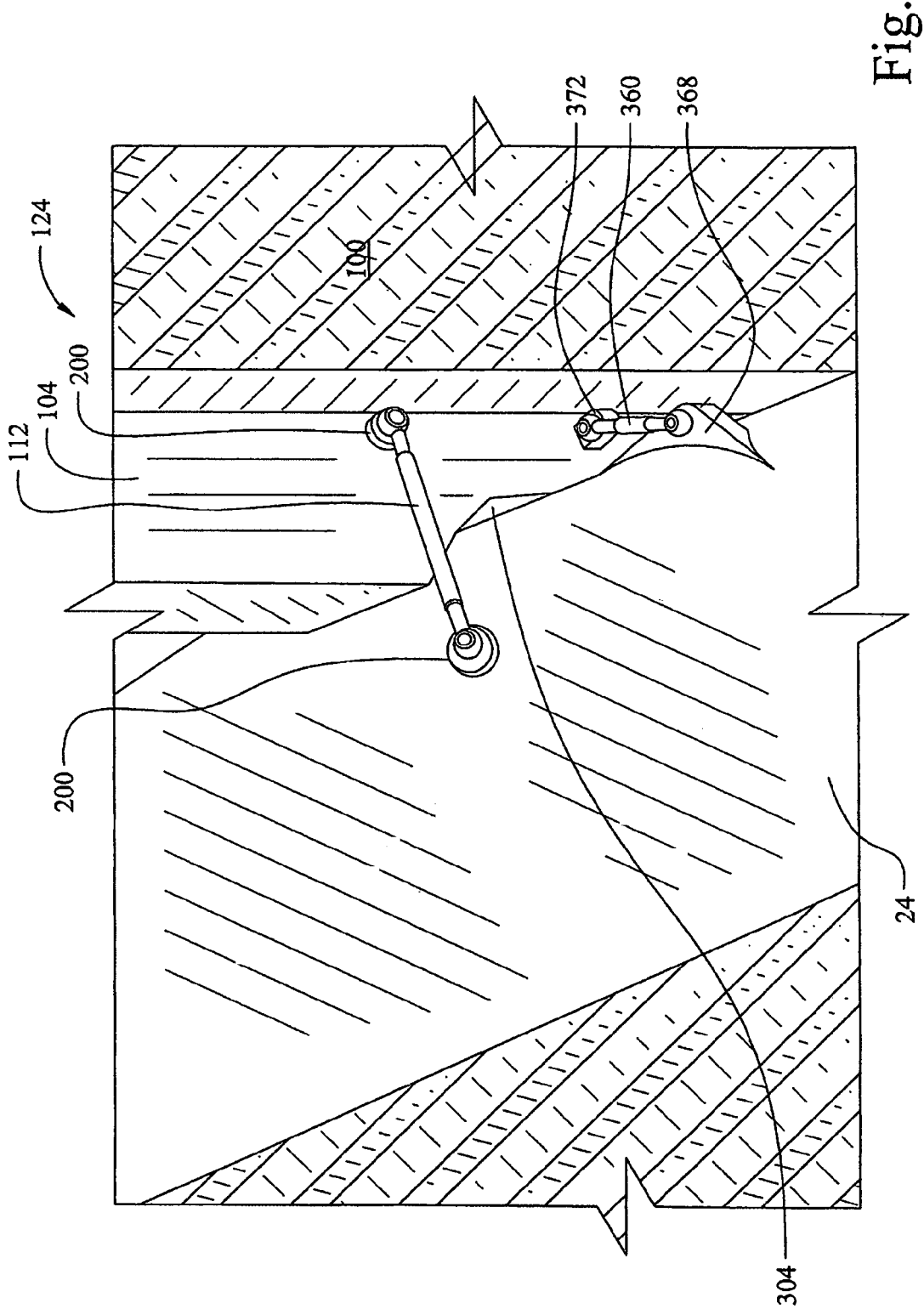
FIG. 7 is a perspective view, taken from inside an aircraft looking down, aft and outboard, of a longitudinal support connection in accordance with one implementation of the disclosure.
Figure 8:
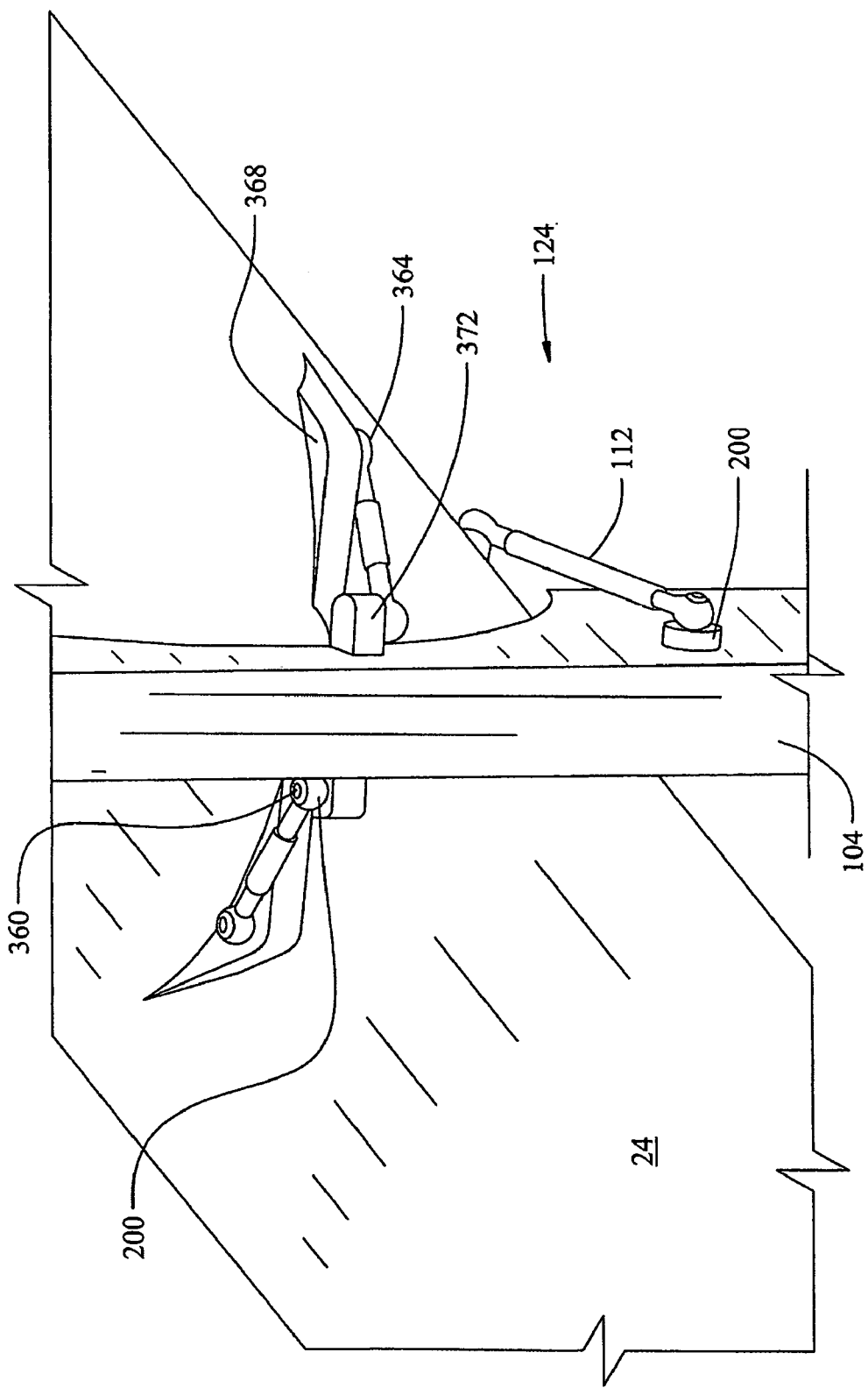
FIG. 8 is a perspective view, taken looking down, forward and inboard, of a longitudinal support connection in accordance with one implementation of the disclosure.

The exemplary longitudinal support connection 124 is shown in greater detail in FIGS. 7 and 8. FIG. 7 is a view taken inside the fuselage structure 12 looking downward, aft and outboard. FIG. 8 is a view taken outside the fuselage structure 12 looking downward, forward and inboard. The connection 124 includes two links 360 and 364 configured to provide fore-aft location of the skin panel 40 on the space frame 12. The links 360 and 364 connect a space frame diagonal element 24 and a panel support beam 104. The lower link 364 provides fore-aft location of the panel 40 to the diagonal element 24. An upper link 112 shown in FIG. 7 is an orthogonal link.

A fitting 368 on the diagonal element 24 provides a connection point for both of the links 360 and 364. Another fitting 372 on the panel support beam 104 provides a connection point for both links 360 and 364 to the panel support beam 104. The two links 360 and 364 are connected to the fittings 368 and 372 to prevent relative fore-aft motion. A lower link 112 shown in FIG. 8 is an orthogonal link.

The links 360 and 364 work in the same or a similar way as the vertical support links 330 described above. If one link 360 or 364 is lengthened and the other is shortened, the panel 40 can be moved fore and aft with respect to the space frame 12 without moving the panel in or out. On the other hand, if both links 360 and 364 are lengthened or if both links are shortened, the panel 40 can be moved in or out (orthogonally) without changing the fore-aft position of the panel.

The links 108 described above are configured to restrain linear motion of skin panels 36 in vertical, horizontal, and longitudinal axes. The links 108 also are configured to restrain rotational motion about all three axes. Even so, essentially no in-plane loads that might arise from in-plane distortion of the space frame 12 would be transferred into a skin panel 36. "In plane" means parallel to the surface of a skin panel 36. Out-of-plane distortion of the space frame 12 may distort a skin panel 36, but where the panel is sufficiently limber in the out-of-plane direction, high loads would not be generated. A panel 36 resists air pressure loads that are orthogonal to the skin surface. These loads are reacted to by the space frame 12. Additionally, small aerodynamic drag loads and inertial loads that may act parallel to a panel 36 surface are reacted to by the underlying space frame 12.

Links 108 provide positive location of a panel 36 relative to a fuselage according to the length of the links and the location of link mounting points 200. Therefore, panels can be located using little if any special tooling. The length of each link 108 can be individually and substantially precisely adjusted while connected to a panel 36. This permits substantially precise adjustment of the panel location relative to the space frame 12 in the in-out directions (orthogonal), with respect to in-plane rotation, vertically and fore and aft. During manufacture, assembly of a panel 36 to a space frame can be accomplished quickly and precisely. Connection of two vertical connections 116, one longitudinal connection 124 and a single orthogonal connection 112 fixes a panel 36 in place on a fuselage structure. These initial connections can be made quickly with a total of seven screws. This limits the time that special tooling or machinery might be needed to support the panel during assembly. Remaining links 108 for a panel 36 can be connected to a fuselage structure after the tooling has been removed. Furthermore, adjustment of the panel location may be made, with substantial precision, while all link connections are in place and after tooling is removed.

Generally, the types, numbers and locations of links provided for a panel vary, e.g., in accordance with panel size, shape, and location on a fuselage. In the exemplary arrangement described above with reference to the panel 40, each load point on the panel 40 is supported by a single link 108. Additionally or alternatively, two or more links 108 could be used at or near one or more of the link locations to build in redundancy. Such links would be connected in such a manner that would prevent creation by two or more links of a moment couple that might resist angular changes of the skin.

Skin Panels

Exemplary types of skin panels include corrugated, sandwich and semi-monocoque panels, e.g., as described below. It should be noted, however, that a skin panel may be configured in many different ways.

Figure 9:
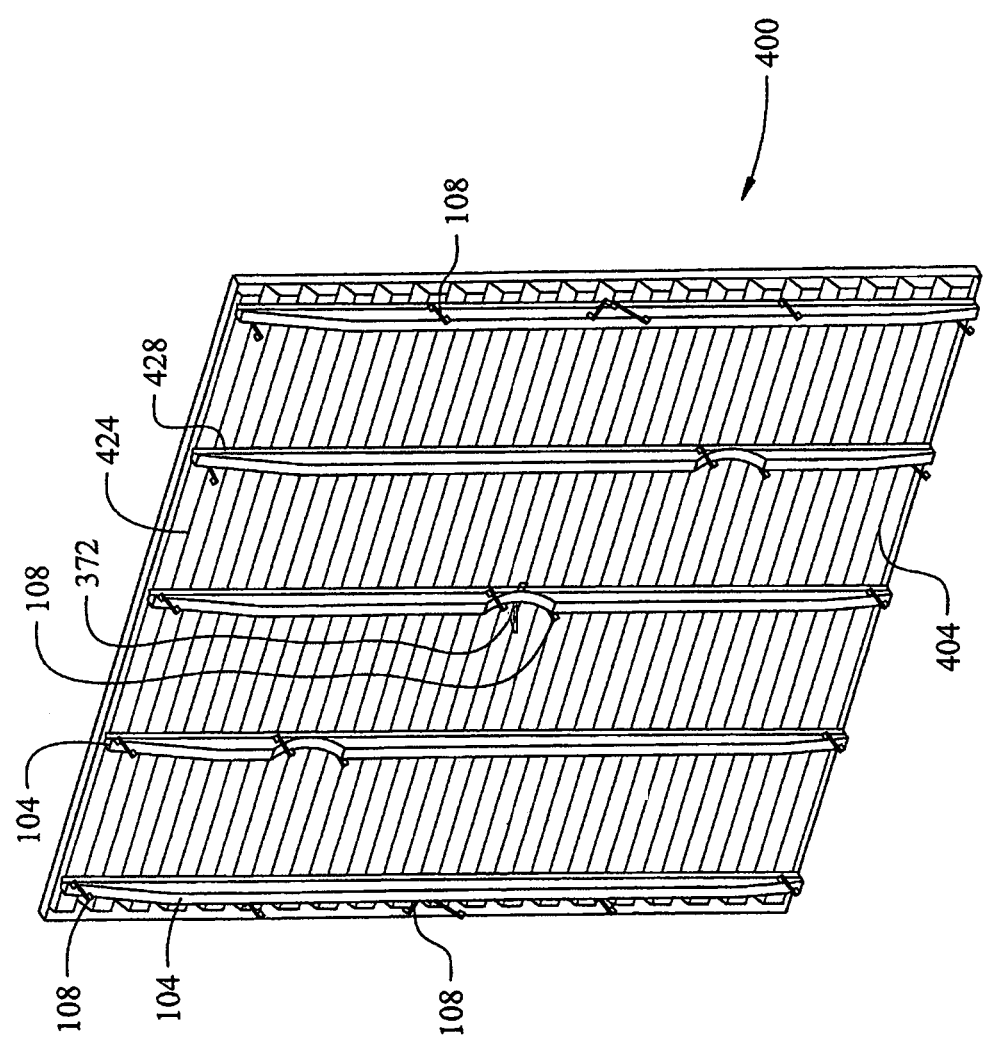
FIG. 9 is a perspective view of an inboard side of a skin panel in accordance with one implementation of the disclosure.
Figure 10:
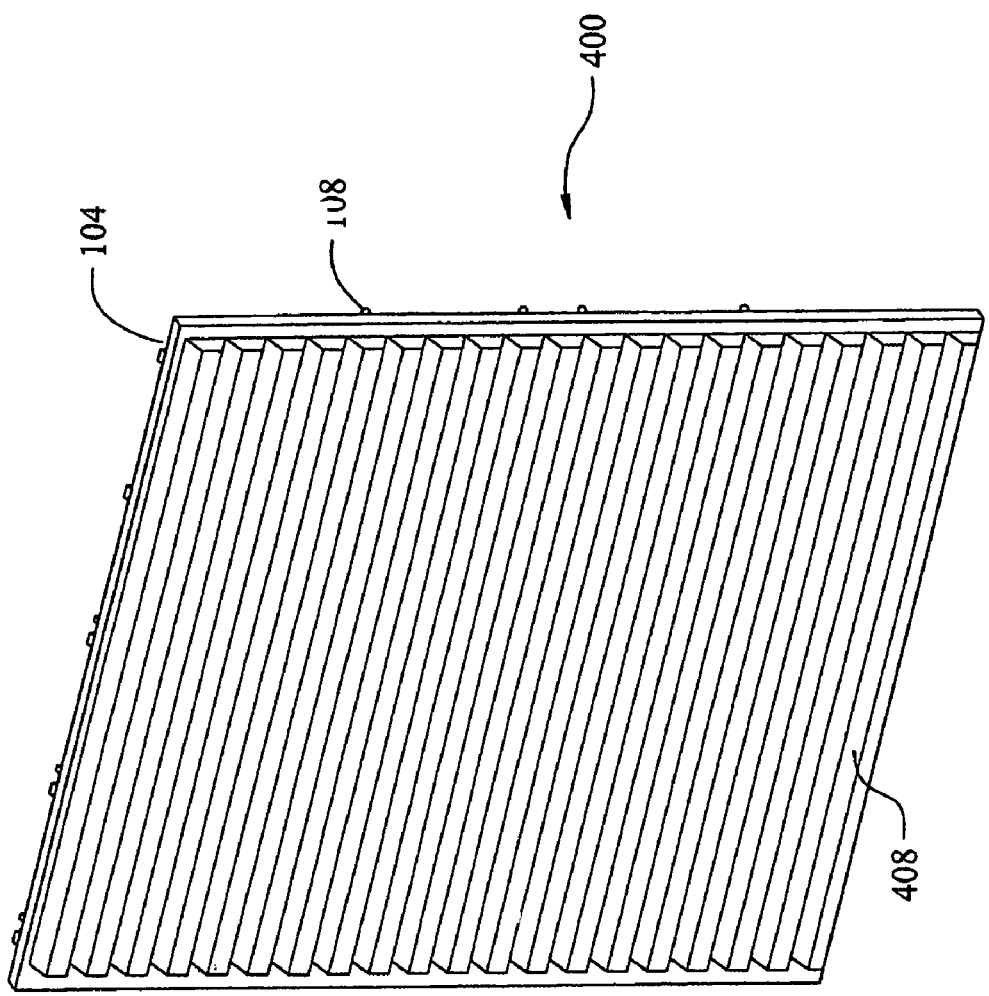
FIG. 10 is a perspective view of an outboard side of the skin panel shown in FIG. 9.

An exemplary corrugated skin panel is indicated generally in FIGS. 9 and 10 by reference number 400. FIGS. 9 and 10 respectively illustrate an inboard side 404 and an outboard side 408 of the panel 400. Referring to FIG. 9, a plurality of panel support beams 104, links 108, and link fittings 372 are provided on the inboard side 404, e.g., in the same or a similar manner as previously described. The panel 400 is fabricated of solid material that is formed into a corrugated shape. The corrugated panel 400 may be made, for example, from metal or a composite material, including but not limited to aluminum alloy and a carbon-epoxy laminate. In the present exemplary panel, corrugations 424 are configured to increase an effective depth of the skin panel 400 to resist deformation in bending between the panel support beams 104. Accordingly, the corrugations 424 are oriented to span longitudinally, between the panel support beams 104. It should be noted that corrugations could include beading in some implementations.

Each of the panel support beams 104 spans across the corrugations 424 and distributes load from the skin panel 400 and link fittings 372 into the support links 108. A panel support beam 104 is sized to provide acceptable deflection and stress levels. Although the support beams 104 have a rectangular cross section, numerous other cross sections are possible, including but not limited to an I or J section. The support beams 104 may be connected to the corrugated skin by a variety of means, including but not limited to bonding and/or mechanical fasteners. It should be noted generally that support beams are not necessarily vertically oriented. Various panel implementations are contemplated in which support beams oriented horizontally and/or in other directions could be used.

A panel-beam angle 428 may be provided, e.g., at the junction of each support beam 104 and corrugated panel. The angle 428 aids in the connection of the panel support beam 104 to the corrugated skin by increasing bonded surface area and/or by providing additional area for application of mechanical fasteners. The angle 428 also provides a terminus, at the junction with the support beam 104, for an internal membrane as further described below.

Figure 11:
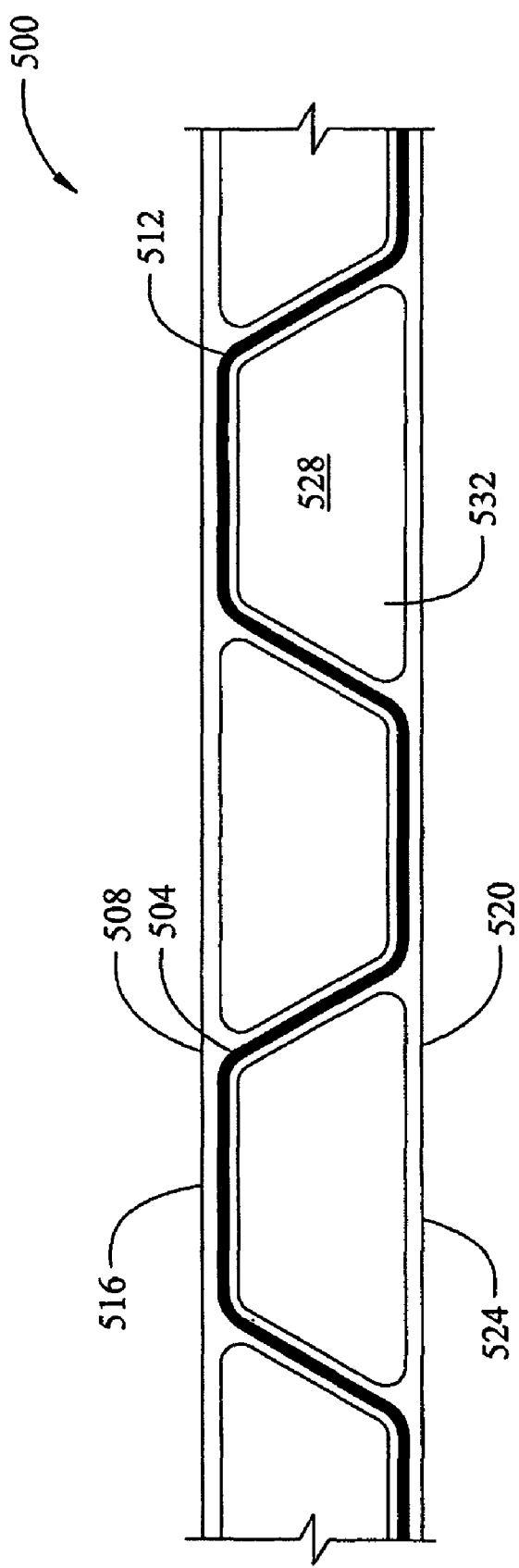
FIG. 11 is a partial cross-sectional view of a corrugated skin panel in accordance with one implementation of the disclosure.

A cross sectional view of one implementation of a corrugated panel is indicated generally in FIG. 11 by reference number 500. A corrugated structural sheet 504 provides strength to the panel 500. A thin membrane 508 covers corrugations 512 on an outer side 516 of the panel 500. A thin membrane 520 also may be provided to cover corrugations 512 on an inner side 524 of the panel. Insulation material 528 is fitted within cavities 532 formed by the corrugated sheet 504 and the membranes 508 and 520. The membranes 508 and 520 are planar and serve to protect the insulation material 528. Insulation material 528 can be provided entirely within an envelope of the form of a panel. By filling both internal and external cavities 532 with insulation, a nearly complete insulation of the inside from the outside can be provided. Insulation material can be in a number of forms, including but not limited to glass wool and/or foamed plastic shaped to fit within the cavities. Thermal insulation thus can be integrated within a skin panel before the skin panel is installed on a fuselage structure.

Referring again to FIG. 1, the fuselage 12 when streamlined would have different pressure levels at different points on its surface according to the shape of the fuselage, proximity to the wing, and so on. In some locations, the surface pressure would be higher than ambient pressure and in other locations it would be lower. Internal pressure of the fuselage 12 would be approximately the same throughout the inside of the fuselage and would likely be at some value between upper and lower pressure extremes on the outside of the fuselage. This means that in some areas of the fuselage there would be a tendency for air to leak from outside to inside the fuselage. In other areas there would be a tendency for air to leak from the inside to the outside. Leakage of air from the inside to the outside of a fuselage skin can be undesirable in that it tends to disrupt flow and increase drag.

The membrane 508 covering the external corrugations 512 is taut to create a smooth, aerodynamically desirable external surface. In addition to providing aerodynamic benefits, the membranes 508 and 520 can also provide environmental protection for the skin panel 500 and insulation 528 without the need for paint. Airplanes operate and are parked outdoors in all sorts of weather. It is generally desirable to keep the inside of an airplane dry in order to reduce corrosion and contamination of aircraft systems and payloads. Materials that could be used in a membrane include but are not limited to plastic film, cloth, and/or thin, metal sheets.

One exemplary membrane material is DuPont™ Tedlar® PVF film, available from E.I. DuPont de Nemours and Company and described at http://www2.dupont.com/Tedlar_PVF_Film/en_US/tech_info/index.html. Other films, e.g., DuPont™ Mylar®, also could be used. In various implementations a membrane material is lightweight and can be used to provide resistance to ultra-violet light and weathering. Where a membrane material can be heat-shrunk, it can be applied to a panel without preload and then made taut with heat. Alternatively, the membrane may be pre-tensioned and then applied to the sheet to provide a taut surface between the corrugations.

Additionally or alternatively, a membrane material can be pigmented. In some configurations, an image may be applied to a membrane for display on the skin of an aircraft. For example, where the membrane is a plastic film such as Tedlar® or Mylar®, a surface of a sheet of the film could be imprinted in various ways such as silk screening and/or ink jet printing. Where the film is transparent (or possibly translucent), the surface bearing the image may be applied directly onto the panel. In such manner, the image may be visible yet protected against the elements. In other implementations, e.g., where a film is opaque, an image could be applied on a film sheet surface that would be applied "face up" onto a panel. An image larger than a single panel could be displayed on a fuselage by applying the image in sections to a plurality of panels for attachment at the desired location on the fuselage.

The external membrane 508 may be adhered to the panel 500, for example, to high areas of the corrugations 512 with adhesive (e.g., glue) and/or double-sided adhesive tape. Similarly, the internal membrane 520 may be applied to the panel 500 in sections, between the support beams 104, using panel-beam angles 428 as a boundary. It may or may not be desirable to make the internal membrane 520 taut. It may be desirable, e.g., in some implementations for the inner membrane 520 to be smooth but not tight. Because the membranes 508 and 520 are non-structural, small repairs can be made quickly, e.g., with Tedlar® tape and a heat gun.

In some configurations, various support links 108 and/or link fittings 372 may be attached to a panel via mounting points 200 installed onto an inner membrane of the panel. Additionally or alternatively, mounting points 200 may be installed onto a corrugated sheet of a panel. An inner membrane may subsequently be applied to the panel, e.g., at least partially around the mounting points 200, so that at least part of a mounting point 200 protrudes through the inner membrane.

Figure 12:
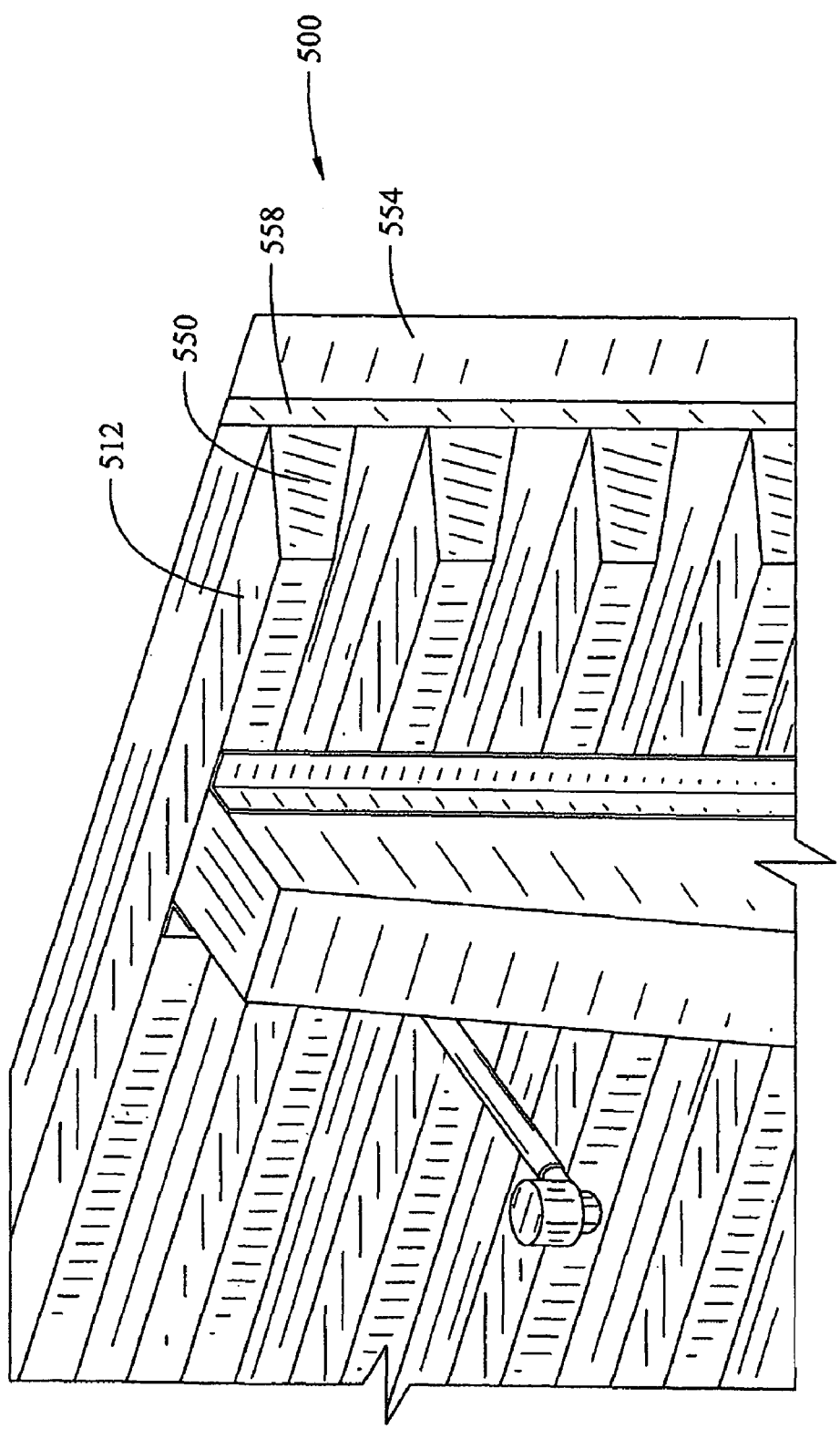
FIG. 12 is a partial perspective view of an inboard side of a skin panel in accordance with one implementation of the disclosure.

A corrugated skin panel may include several details at its edges. For example, as shown in FIG. 12, corrugations 512 are "closed out" by end caps 550. Such a closeout provides a planar end to the panel 500 so that the membranes 508 and 520 can be supported around the entire panel perimeter. An edge extension 554 also may be provided that may be mated with an edge of a neighboring panel. The edge extension 554 also has an indentation or setback 558 to allow for overlap by a neighboring panel while maintaining a substantially smooth exterior conforming to a common shape.

Figure 13:
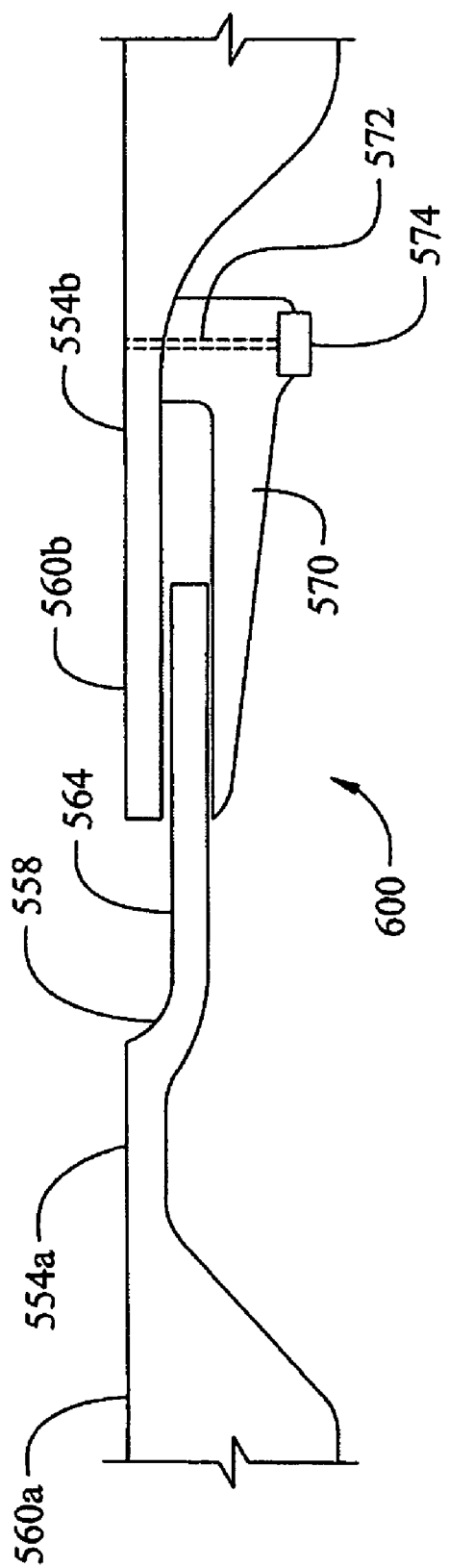
FIG. 13 is a partial cross-sectional view of a slip joint between two skin panels in accordance with one implementation of the disclosure.

FIG. 13 is a cross sectional view of a slip joint 600 between two panel edge extensions 554a and 554b. The panel edge extension 554a has a setback 558 to accommodate the edge extension 554b. In such manner, outer surfaces 560a and 560b formed by the panel edge extensions 554a and 554b remains substantially flush while providing a gap 564 to account for relative motion of the edge extensions 554a and 554b. A seal 570 is attached along at least part of the edge extension 554b to minimize leakage through the slip joint 600. In the present exemplary configuration the seal 570 is flexible and attached by fastener(s) 572 and a clamping bar 574 to the edge extension 554b. It is contemplated that many different types of seals could be used to prevent slip joint leakage.

Generally, corrugations may be configured to minimize weight, which would be a product of the actual surface area of a panel (accounting for extra area created by the corrugations) and the thickness of the panel (the actual sheet thickness, not the depth of the corrugations). The thickness of a panel may be constrained by durability considerations, including but not limited to panel strength needed during manufacturing and while in service. A "minimum gauge" may be set based on such considerations. Given a minimum gauge, one may calculate an approximate depth of corrugation needed to provide sufficient strength and rigidity to span between panel support beams.

Width of corrugations may depend on several considerations. Where external corrugations are covered with a taut membrane, deflection of such a membrane under load depends in part on width of the corrugations. Narrower corrugations result in less membrane deflection, which is typically desirable. On the other hand, given a corrugation depth and skin thickness, a lighter panel results from a wider corrugation because less area is expended on the web portion of the corrugation. Another consideration is structural stability (i.e., resistance to crippling) of corrugations. A narrower corrugation improves resistance to crippling and permits higher stress levels in a panel.

Sandwich Panel

In some implementations, a sandwich panel may be used. An exemplary sandwich panel is indicated generally in FIG. 14 by reference number 700. The panel 700 includes, e.g., outer and inner "face sheets" 702 and 704 separated and supported by a core 706. Aerospace face sheet materials include aluminum alloy and/or carbon-epoxy laminate. Core materials include metal or aramid honeycomb material and/or plastic foam. A "sandwich" is usually bonded together using an adhesive. A sandwich panel may be supported in the same or similar manner as previously described for a corrugated panel, e.g., by panel support beams 104. Although not shown in FIG. 14, a panel-beam angle 428 may be used to enhance connection between a sandwich panel and a support beam 104. The perimeter of a sandwich panel may be closed out in various ways to achieve an edge that is the same as or similar to that of the corrugated skin panel.

A number of comparisons may be made between sandwich panels and corrugated panels. The external surface of a sandwich panel is typically fully defined by a smooth outer skin, even when the panel is simply curved or compound-curved. In contrast, a corrugated panel having a tight or compound curvature may exhibit facets or ridges. The core of a sandwich panel can also provide insulation value, which may be sufficient in some applications (such as a large cargo airplane) to avoid a need for additional application of insulation. Note that an insulation value of a foam plastic core is likely to be superior to that of a honeycomb core, while mechanical properties of a honeycomb core are likely to be superior. Where stress levels on a core are sufficiently low, plastic foam cores can be used without a mechanical penalty. A sandwich panel (not counting support beams) can be made in a single, consolidated process, whereas a corrugated panel is typically made in a plurality of steps.

Sandwich panels are also typically subject to minimum gauge considerations for durability. Because they have two skins (inner and outer) plus a core and adhesive, a sandwich panel is likely to be heavier than a corrugated panel. An optimal structural depth of a sandwich panel is likely to be less than that of a corrugated panel. Thus there may be less room provided for an insulating core material. Accordingly, insulating performance of a sandwich panel may be less than that of a corrugated panel. Sandwich panels are typically painted, adding weight. However, a plastic film could be applied to a sandwich panel in the same or similar manner as for a corrugated panel.

Semi-Monocoque Panel

In various implementations, a semi-monocoque panel may be used. An exemplary semi-monocoque panel is indicated generally in FIGS. 15A and 15B by reference number 730. The panel 730 includes a thin, solid outer skin 732 and closely spaced and approximately parallel stiffeners 736 (also called stringers). Frame elements 740 also may be provided approximately orthogonally to the stringers. The frame element 740 shown in FIG. 15A includes holes 744 (also called "mouseholes") to accommodate the stringers 736. The frame elements 740 function in a similar manner as support beams 140 for a corrugated panel. Links 108 may be attached between the frame elements 740 and a fuselage structure as previously described. Stringers 736 provide structural depth, in combination with the skin 732, spanning from frame element 740 to frame element 740. The skin 732 provides an aerodynamic surface and is structurally active in combination with stringers 736 and frame elements 740.

A semi-monocoque panel may be made of composite or metallic materials, including but not limited to carbon-epoxy laminates and/or aluminum. Minimum gauge limitations typically would be used to define a skin depth. A skin of semi-monocoque panels may be lighter than a corrugated or sandwich skin. This possible weight savings could be offset by the weight of stringers and practical considerations. For example, a skin having semi-monocoque panels would entail a higher part count and more tooling than a skin having corrugated or sandwich panels. Precise connection of skin, stringers and frames would entail the use of precision tooling to hold various parts in position during a fastening process. This would be especially the case for panels having simple or compound curvature. Each panel, especially panels having compound curvature, would be manufactured with substantial precision. Minor errors in shape could be accommodated by adjustability of a mounting system. Integration of insulation is more complex for a semi-monocoque panel than would be the case for corrugated and/or sandwich panels. Insulation is likely to be a separate blanket that is a discrete assembly that is to be attached to the inside of a panel. A semi-monocoque panel also could be painted or could receive a coating of film.

The foregoing various embodiments of skin panels are exemplary only. Other or additional types of panels could be used in assembling a fuselage skin. It should be noted that since skin panels can be assembled on a fuselage as structurally independent of one another, different types of panels can be used in different areas of a fuselage according to desired characteristics.

Various methods in accordance with principles of the disclosure can be used to provide complete, self-contained skin panels. A complete panel includes environmental protection (plastic film or paint) and, in some cases, insulation and is ready to mount to an underlying fuselage structure. These complete panels are generally compact in form. Accordingly, several panels may be packaged together for transportation from a manufacturing site to a separate assembly site. Antennas, radar, lights, pressure probes, cameras, air data sensors and/or other equipment can be built into panels at the manufacturing site. An item of equipment thus can be substantially automatically installed in a fuselage by virtue of subsequent assembly of the panel into the fuselage.

Figure 16:
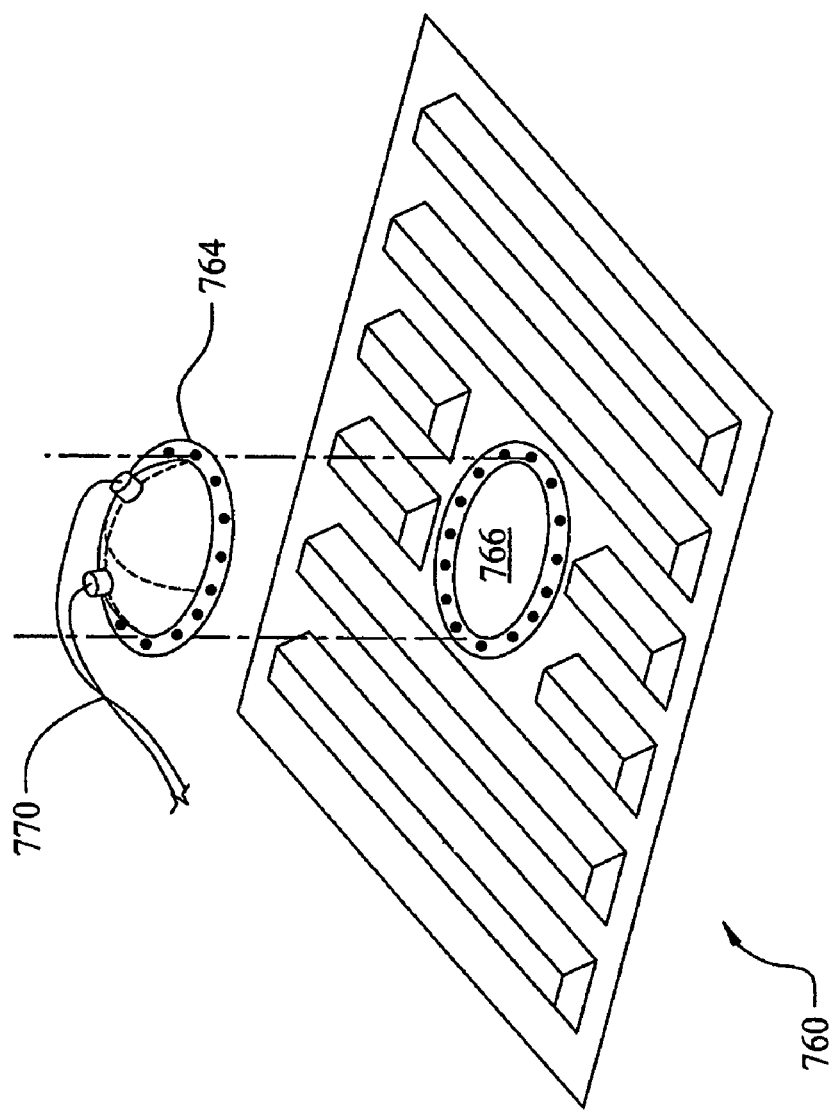
FIG. 16 is a perspective view of an interior side of a panel in which provision is made for installing equipment in accordance with one implementation of the disclosure.

For example, a corrugated panel in which provision is made for installing equipment is indicated generally by reference number 760 in FIG. 16. The panel 760 is configured for installation of a lamp housing 764 in an elliptical opening 766. The lamp housing 764 provides electrical wiring 770. Electrical interconnects could be provided at or near a link 108 that resists fore-aft loads (e.g., on a diagonal truss element 24) or up-down loads (e.g., on a vertical truss element 16). Wiring could be extended to its destination along elements of the space frame. Other or additional types of equipment and/or interconnects could be provided, including but not limited to connections for radio or light transmission (e.g., fiber optic or laser), a pitot tube or a static port that connects to an air line that connects to a remote pressure sensor, a camera signaled by radio and configured to relay pictures to a computer via radio, etc. The foregoing feature can result in substantial savings of labor cost due to the increased accessibility of the panels during manufacture and can also save valuable time during final assembly.

In various implementations of the disclosure, skin panels are provided that are not structurally essential to the safe operation of the airplane. A damaged panel may be easily and quickly removed and replaced without concern for the overall structural integrity of the fuselage structure. This speeds the repair process and limits the period of time the airplane is out of service. Over time, it may be that improved skin panels can be made due to improvements in materials or for other reasons. Easy removal and replacement of skin panels on the airplane means that upgraded panels could be easily and quickly exchanged for existing panels on an airplane. Furthermore, panels with alternate functions can be quickly exchanged for existing panels in order to change or improve the capability of the airplane.

In contrast, to fabricate a conventional "stringer and frame" skin, components must each be made precisely. Components must be joined in tooling to form a panel, which must be joined in a larger tool with other panels to form a fuselage. There is no dimensional integrity to the components until they are mostly joined together in a tool. Additionally, joints between major fuselage sections frequently require shimming or other adjustments to fit properly. Skin repair requires an extensive, expensive and time-consuming process. The airplane cannot be used while the repair is being made, so this can be the most expensive aspect of the damage. It is a limitation of the repair that it must be performed to very high standards in order to meet the requirements of primary structure.

The foregoing systems and methods can be used to decouple a fuselage skin from general fuselage loads. In such manner, buckling of the skin resulting from general fuselage loads can be avoided. In various implementations, a skin panel can be sized so that it need only be strong enough to bear pressure loads and meet minimum gauge requirements. This results in a very lightweight skin that exhibits little (that is, acceptable) deformation from aerodynamic pressure loads. Acceptable deformation is typically approximately 0.01 inch per inch, i.e., one inch of permissible deflection per 100 inches of length in the stream-wise direction. Inertial loads due to gravity, acceleration, braking and in-plane loads due to aerodynamic drag are transferred to underlying fuselage structure. Loading of a panel is distributed into fuselage structure such that the loading at any one point is not excessive. Conversely, panel linkage is distributed such that panel loads and deflections are reduced to levels that impose little weight penalty on the panels. A skin structure can be constructed with reduced stabilization from additional structural elements. This in turn permits a relatively simple and very lightweight skin structure. Such a structure can be inexpensive to construct.

The foregoing systems and methods can be used to provide fuselage skins that are protected against environmental threats such as ultraviolet light, moisture and cleaning treatments (e.g., abrasion, chemicals). Air and water leakages through the skin also can be limited to acceptable levels. At least one skin panel embodiment permits integration of thermal insulation within the skin panel such that the insulation is permanently installed before the skin panel is installed on the airplane. This represents a simplification of the assembly and inspection process that can result in reduced manufacturing and operating cost.

Through use of the foregoing systems and methods, a fuselage structure and an aerodynamic skin can be shaped independently of each other. In such manner, aerodynamic streamlining can be provided for a space frame fuselage structure and its cargo. A skin having a generally smooth surface and an aerodynamically favorable shape can be achieved. An ideal aerodynamic shape may be substantially different from an ideal arrangement of an underlying fuselage structure. In various implementations, an aerodynamic shape can be achieved that cloaks an underlying structural form even if the two forms are quite different.

In various configurations, skin panels are modular and are generally independent of one another. Mounting a skin requires little or no assembly tooling. A skin panel can be adjusted rapidly, easily and precisely in three dimensions and three angles. In some embodiments of the skin panel, integral fuselage skin insulation can be provided. Additionally or alternatively, skin panel fabrication can be performed using single-sided tooling. For example, composite versions of corrugated and sandwich panels can be molded on a single female skin mold. In various implementations in which a skin panel can be pigmented, a need for painting can be eliminated or reduced. Various implementations of the disclosure provide means for reducing the time and costs for repairing or replacing damaged skin.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. An aircraft comprising:
a plurality of truss elements configured to form a space frame fuselage;
a plurality of panels connected with the truss elements and configured to form a skin over the space frame fuselage, the panels movable relative to one another so as to prevent loading of the space frame fuselage from inducing loading in the skin; and
a plurality of elongate links connecting the panels with the truss elements, each link having an adjustable length and first and second ends, each end attached to a corresponding boss permitting limited rotation of the link relative thereto, the boss of the first end affixed to one of the panels, and the boss of the second end affixed to one of the truss elements.

2. The aircraft of claim 1, wherein the links are configured to transfer loading associated with the panels to the fuselage.

3. The aircraft of claim 2, wherein links connecting one of the panels with the fuselage constrain motion of the panel in each of three orthogonal directions.

4. The aircraft of claim 2, wherein links connecting one of the panels with the fuselage constrain rotational motion of the panel in a plane of the panel.

5. The aircraft of claim 1, wherein the panels are substantially rigid.

6. The aircraft of claim 1, wherein at least some of the panels overlap one another.

7. The aircraft of claim 6, wherein the overlapping panels include a first panel and a second panel in overlapping relationship with the first panel, the first panel comprising a seal configured to seal at least part of an area of overlap between the first panel and the second panel.

8. The aircraft of claim 1, wherein the panels are structurally independent from one other.

9. The aircraft of claim 1, wherein each panel has at least three sides.

10. The aircraft of claim 1, wherein at least some of the panels are coupled to load-bearing members of the fuselage.

11. A method of assembling an aircraft comprising:
attaching a plurality of panels to a plurality of truss elements of a space frame fuselage to form a skin over the fuselage, the attaching including mounting a first end of one elongate link of a plurality of elongate links to a boss of one of the panels and mounting a second end of the one elongate link to a boss of one of the truss elements, the mounting performed to permit limited rotation of the first and second ends relative to the bosses;
the attaching further including attaching the plurality of elongate links by performing the mounting so as to leave each completely attached panel structurally independent of the other attached panels.

12. The method of claim 11, the attaching further comprising providing a slip joint between two of the panels.

13. The method of claim 11, further comprising:
configuring a shape of the fuselage; and
configuring the panels to provide a skin shape different from the shape of the fuselage.

14. The method of claim 11, further comprising applying an image onto one or more of the panels,
the attaching further comprising assembling the one or more of the panels to display the image on the skin.

15. The method of claim 11, the method further comprising adjusting a length of one or more of the attached links to adjust a location of an attached panel relative to the fuselage, the adjusting of the length performed without detaching the one or more attached links.

16. A method of assembling an aircraft, the method comprising:
connecting a plurality of elongate links between a plurality of skin panels and a plurality of truss elements of a fuselage space frame to attach the panels to the fuselage to form a skin over the fuselage, each link having an adjustable length between first and second ends of the link, the connecting performed in part by rotatively connecting the first end of one of the links to a boss of one of the panels and rotatively connecting the second end of the one of the links to a boss of one of the truss elements; and
adjusting location of one of the attached panels relative to the fuselage, the adjusting performed by lengthening or shortening one or more of the adjustable lengths without disconnecting any of the ends of links from the bosses.

17. The method of claim 16, wherein attaching the panels comprises movably overlapping at least some of the panels.

18. The method of claim 16, further comprising configuring the panels to provide a skin shape substantially different from a shape of the fuselage.

19. The method of claim 16, wherein adjusting location of one of the attached panels comprises adjusting a threaded connection between the first or second end of a given link and a body of the given link.

20. The method of claim 16, 19, wherein the threaded connection is a right-handed connection between the first end of the given link and the body of the given link, the method further comprising adjusting a left-handed threaded connection between the second end of the given link and the body of the given link.

21. The method of claim 16, further comprising adjusting location of one or more of the attached panels relative to at least one of the other panels.

22. The method of claim 16, further comprising molding at least one of the panels using a single-sided mold.

23. An aircraft skin panel comprising:
a first side having a substantially smooth surface; and
a second side onto which a plurality of support beams are attached, the support beams having a plurality of elongate links attached thereto for linkage with truss elements of an aircraft space frame fuselage, the support beams further configured to transfer loading of the panel through the links to the space frame fuselage;
each of the links having a first end rotatively mounted to a boss affixed to the panel, and a second end configured for rotative mounting to a boss affixed to a truss element;
the rotative mounting of the first and second ends of a first of the links configured to constrain motion of the panel in a direction orthogonal to the fuselage while permitting vertical and longitudinal motion of the panel relative to the fuselage;

the rotative mounting of the first and second ends of a second and third of the links configured to constrain vertical motion of the panel relative to the fuselage; and the rotative mounting of the first and second ends of a fourth and fifth of the links configured to constrain longitudinal motion of the panel relative to the fuselage.

24. The panel of claim 23, further comprising at least one edge configured to provide a slip joint between the edge and an edge of another panel.

25. The panel of claim 23, further comprising a corrugated sheet between the first and second sides.

26. The panel of claim 25, further comprising a membrane covering the corrugated sheet to form the first and second sides, the mounting points affixed to the second side over the membrane.

27. The panel of claim 25, further comprising a membrane covering the corrugated sheet to form the first and second sides, the mounting points affixed to the corrugated sheet and at least partially covered by the membrane.

28. The panel of claim 23, the first side comprising a membrane and at least a portion of an image embedded in the membrane.

29. The panel of claim 23, further comprising an insulating material between the first and second sides.

30. A method of making an aircraft skin panel comprising:
    attaching a plurality of support beams to a corrugated sheet;
    affixing a plurality of elongate links to the support beams, the links configured to provide adjustable connections between the support beams and truss elements of an aircraft fuselage space frame; and
    applying a membrane material to at least one side of the corrugated sheet to form a membrane substantially spanning corrugations of the sheet;
    the affixing of the links including affixing a boss to one of the support beams and mounting a first end of one of the links to the boss to permit limited rotation of the first end relative to the boss, where a second end of the one of the links is configured for mounting to a boss on one of the truss elements to permit limited rotation of the second end relative to the boss on the one of the truss elements.

31. The method of claim 30, further comprising positioning insulation on the at least one side before applying the membrane material.

32. The method of claim 30, further comprising applying at least a portion of an image to the membrane.

33. The method of claim 30, further comprising providing an edge on the corrugated sheet to allow a slip joint to be formed between a skin panel including the sheet and an edge of another skin panel.

34. The method of claim 30, further comprising heat shrinking the membrane material on the sheet to form the membrane.

35. The method of claim 30, the links further configured to transfer loading of a skin panel through the links to the fuselage space frame.

36. A method of providing equipment on an aircraft comprising:
    attaching a skin panel to truss elements of a space frame fuselage of the aircraft, the panel including an item of equipment and an interconnect connected with the at least one item, the attaching performed by connecting a plurality of elongate links on support beams of the panel with the truss elements; and
    connecting the skin panel interconnect with an interconnect provided in or on the fuselage;
    wherein connecting the links comprises rotatively mounting a first end of one of the links to a boss of the support beam and rotatively mounting a second end of the one of the links to a boss of one of the truss elements.

37. A method of repairing an aircraft comprising:
    removing one of a plurality of panels forming a skin of the aircraft, the removing performed by detaching at least one end of each of a plurality of links attached between support beams of the panel and truss elements of a space frame fuselage of the aircraft; and
    attaching a replacement panel to the aircraft in place of the removed panel;
    wherein the detaching of one of the at least one end consists of dismounting the one of the at least one end from a rotative mounting to a boss affixed to the panel being removed.

38. The method of claim 37, performed substantially independently of the other panels.

39. The method of claim 37, wherein the attaching comprises connecting links between the replacement panel and the fuselage truss elements by rotatively mounting ends of the links to bosses affixed to the replacement panel and the truss elements.

40. The method of claim 39, further comprising adjusting one or more lengths of the connected links to adjust a location of the replacement panel, the adjusting performed without disconnecting any of the connected links.

* * * * *